United States Patent [19]

Crean et al.

[11] 4,395,716

[45] Jul. 26, 1983

[54] BIPOLAR INK JET METHOD AND APPARATUS

[75] Inventors: Peter A. Crean, Penfield, N.Y.; John M. Schneider, Spring Valley, Ohio; Anthony F. Lipani, Webster, N.Y.

[73] Assignee: Xerox Corporation, Stamford, Conn.

[21] Appl. No.: 296,922

[22] Filed: Aug. 27, 1981

[51] Int. Cl.$^3$ .................... G01D 18/00; G01D 15/18

[52] U.S. Cl. .................................... 346/1.1; 346/75

[58] Field of Search ......................... 346/1.1, 75, 140

[56] References Cited

U.S. PATENT DOCUMENTS

| | | | |
|---|---|---|---|
| 3,596,275 | 7/1971 | Sweet | 346/1 |
| 3,827,057 | 7/1974 | Bischoff et al. | 346/75 |
| 3,828,354 | 8/1974 | Hilton | 346/1.1 |
| 3,877,036 | 4/1975 | Loeffler et al. | 346/75 |
| 3,946,399 | 3/1976 | Zaretsky | 346/1.1 |
| 4,054,882 | 10/1977 | Ruscitto | 346/1 |
| 4,238,804 | 12/1980 | Warren | 346/75 |
| 4,272,771 | 6/1981 | Furukawa | 346/75 |

*Primary Examiner*—Donald A. Griffin
*Attorney, Agent, or Firm*—Robert A. Chittum; Stephen J. Schultz

[57] ABSTRACT

An improved ink jet marking architecture for enhancing ink droplet placing accuracy. The improved architecture combines a bipolar scanning arrangement with a drop interlace scheme. The preferred marking apparatus comprises an array of ink jet column generators which direct ink droplets to first a charging region and then through a deflection region. The droplets are charged either negatively or positively depending on a desired droplet trajectory; thus the bipolar designation. The deflection region has an electric field strength slightly less than the breakdown field strength of air for the environment in which the apparatus is to operate. The high field strength reduces the charge which must be applied to the droplets and therefore minimizes the drop to drop coulomb interaction. The interlace strategy causes sequential drops from a given generator to be printed in non-sequential locations on the paper. This strategy spreads out the ink droplets in space and results in a reduction of both aerodynamic and coulombic interaction between droplets. By reducing these interactions and minimizing the time of flight for the drops the placement accuracy is increased. The placement accuracy is further enhanced by utilizing a charging scheme which takes into account the charge induced on other droplets in close proximity of the droplet to correct for coulomb interactions even the bipolar plus interlace strategy cannot avoid.

4 Claims, 9 Drawing Figures

BIPOLAR INK JET METHOD AND APPARATUS

BACKGROUND OF THE INVENTION

1. Field of the Invention

The present invention relates to ink jet printing and more particularly concerns an ink jet printer configuration which enhances ink droplet placement accuracy.

U.S. Pat. No. 3,596,275 to Sweet discloses a recording system wherein a sequence of ink droplets are directed to a recording medium in a controlled manner in order to encode that medium with information. Subsequent to the work done by Sweet, a variety of ink jet architectural designs have been proposed to enhance ink jet recording performance. These alternate designs have had as an aim, increased speed, improved resolution, reduced cost, and improved reliablity and maintainability.

A typical Sweet-type ink jet printer has one or more ink jet nozzles through which ink under pressure is directed toward a record medium which might, for example, comprise a sheet of paper. As ink is forced through the one or more nozzles, an exterior source of energy provides a perturbation to the ink to induce droplets of ink to break off at controlled intervals a well-defined distance from the ink jet generator. At the point of droplet breakoff, these droplets may be immediately charged by induction so that the droplet trajectory may be altered by a uniform electric field downstream from the droplet formation point.

The Sweet-type ink jet generators can be subclassified according to the particular configuration employed. In one type of arrangement, the ink droplets travel in a path dependent on their charge to a guttering system or in the alternative, the ink droplet is charged to avoid the guttering systems and travels to the paper. This architectural scheme is the basis for so-called binary ink jet systems. In the binary system, either a 1:1 correspondence exists between the number of ink jet nozzles and the incremental areas of coverage on the paper, or some type of relative transverse movement between generators and paper is provided so that one nozzle can throw ink to more than one picture element or pixel.

A second type of Sweet ink jet system employs a transverse scanning arrangement wherein once the droplets have been charged to an appropriate value, passage through the uniform electric field interposed between the generator and the record medium causes the ink droplet to scan transverse to the direction of paper motion. In this so-called "stitched" arrangement, a given ink jet nozzle supplies ink droplets to a number of incremental areas (pixels) on the paper. The term "stitched" derives from the fact that ink droplets from adjacent nozzles must be carefully positioned so they stitch together to completely cover the paper. It should be appreciated that for both a stitched type and binary type ink jet arrangement, relative longitudinal movement between the generator and the paper is provided as the ink droplets fly toward the paper.

One generic type ink jet printer uses a so called "drop on demand" drop printing technique. In this type system, relative movement between the paper and the ink jet generator is provided in a manner similar to the Sweet system. In the drop on demand system, however, ink droplets are generated only for those incremental areas on the paper where information is to be encoded. These systems require no guttering system since all droplets emitted from the generators strike the paper. A second feature of the drop on demand system is that no charging mechanism is required to alter the path of ink droplet travel. Each droplet follows a straight path to the paper so that no electric field generating apparatus is required. From the above it is apparent that both Sweet-type and "drop on demand" type jet printers have certain similarities, i.e. both configurations direct droplets of ink at a recond medium such as paper or the like, at controlled times to encode regions of the medium in a controlled way. The attraction of the "drop on demand" technique is that no charging and guttering equipment is required.

One perceived constraint on the "drop on demand" configuration is an upper boundary to the speed of information throughput such a system can handle. If, for example, the ink jet system is to be employed in a letter quality printer, it is presently believed a copy rate of about one page every thirty seconds is possible with the drop on demand system. While this speed may be adequate for a typewriter, it is not adequate for other ink jet applications. Those ink jet applications requiring high speed operation have favored the Sweet-type continuous drop production systems.

In a high speed ink jet copier/printer, the record medium must move past the ink jet generator at a fairly high rate of speed, and while doing so, each of the droplets generated must either be accurately directed to a particular paper position or to an ink gutter. Sources of inaccuracy of drop placement are encountered from either drop to drop electrostatic interactions or drop to air aerodynamic forces which divert the droplet from a preferred trajectory to the paper.

The aerodynamic interaction between a drop and the air in the vicinity of the drop would produce few, if any, adverse affects if the droplet were passing to the paper by itself without the slipstreaming effects caused by the presence of neighboring droplets close to a particular droplet. Each droplet would experience braking forces due to air resistance and deaccelerate uniformly. In a stream of droplets, however, those drops that lead the way experience greater braking than those drops in their wake. The lead drops spend a longer time in the deflecting field than does an identical droplet traveling in its wake. The increased time the droplet is deflected by the electric field causes a greater deflection of the drop and this difference in deflection caused by aerodynamic effects must be taken into account in a drop placement strategy.

The difference in drop speed caused by aerodynamic effects alters the placement strategy in a second way. It should be recalled that the paper is moving relative to the drop generator at a fairly high rate of speed. The braking cause by aerodynamic forces will cause an otherwise identically generated droplet to arrive at the paper plane later than a droplet traveling in the wake of a preceding drop. This difference in transit time again introduces a further source of drop misplacement.

The aerodynamic effects experienced by moving drops can also have affects on the drop to drop electrostatic interaction. Droplets experiencing greater aerodynamic braking will fall back into close proximity to faster moving drops. Since the drops are charged, this can result in either a merging together of two droplets or possibly an electrostatically generated bouncing away of one drop from another. Either phenomenon will disrupt the originally anticipated droplet trajectory and lead to drop placement error.

Electrostatic interactions in addition to the aerodynamically induced electrostatic interaction as mentioned above can affect the trajectory of the droplets in their travel to the paper plane. A first electrostatic interaction occurs as the droplets are being charged in a charging tunnel. Each of the three or four droplets preceding a given drop will induce a secondary charge on the drop as that drop is being formed. Unless compensated for at the time of droplet formation, this induced charge phenomena adds another source of droplet misplacement.

Even without the aerodynamic affect discussed previously, the electrostatic forces between drops in flight can deflect them from their intended trajectory and thereby cause droplet misplacement errors. Electrostatic interaction begins once the droplets are produced and continues until the droplet strikes either the paper or the gutter. Sweet-type architectures with a stitched drop configuration encounter particularly severe electrostatic interaction. In the stitched configuration, where bipolar scanning is used, i.e. droplets are both positively and negatively charged depending upon their desired trajectory, highly charged droplets directed to the gutter can have significant interactions with either negatively or positively charged droplets in close proximity to the gutter droplets. Droplets whose intended trajectory is to the paper can interact with the gutter ink droplets before deflection occurs. It is therefore seen to be desirable that the charge on all droplets be minimized so that electrostatic interactions are also reduced.

Once charged droplets enter the deflecting field, a drop may experience electrostatic attraction or repulsion as it begins to deflect away from the gutter trajectory. This phenomenon is particularly troublesome for those droplets in close proximity to highly charged gutter droplets in a bipolar system. The length of time a given drop spends close to a highly charged gutter drop varies inversely with the intended deflection of the droplet. A drop deflected to a pixel far away from the gutter stream experiences the least affect because of its rapid deflection away from the gutter stream. Conversely, drops directed to pixels in close proximity to the gutter stream experience the greatest electrostatic effects and therefore the most pronounced drop placement errors.

From the above it should be seen that so long as a charged droplet is moving through air in close proximity to other charged droplets, sources of drop placement inaccuracies are inevitable. It is an aim, however, of the present invention to reduce as much as possible, the deleterious effects such interactions cause.

2. Prior Art

Efforts to reduce the adverse affects caused by electrostatic and aerodynamic interactions between closely adjacent droplets are known in the art. U.S. Pat. No. 4,054,882, for example, discloses a technique for interlacing or non-sequentially directing ink droplets to a recording medium. The theory behind the technique disclosed in U.S. Pat. No. 4,054,882 is that once the droplets are charged, it is desirable that closely adjacent droplets be separated so that the inverse square drop off in coulomb interaction is experienced. An interlace strategy such as the one disclosed in U.S. Pat. No. 4,054,882 also reduces the aerodynamic interactions between closely adjacent droplets in the droplet stream. A more uniform aerodynamic breaking effect is experienced by each of the droplets in the stream rather than some droplets having their path shielded by previous droplets in the sequence.

Another technique known in the art for reducing electrostatic and aerodynamic interactions is the use of guard drops. Guard drops are drops which are directed to the gutter but separate those droplets which are intended to strike the paper. Use of guard drops is inefficient since all guard drops are guttered and never used for printing.

While U.S. Pat. No. 4,054,882 addresses the aerodynamic and electrostatic interaction between droplets, practice of the present invention further reduces the adverse effects of these phenomenon and in particular reduce these effects in a bipolar scanning type Sweet system. It should be appreciated that bipolar scanning systems are not new per se, but that the present invention relates specifically to an improved bipolar system in which the interaction between droplets and air are reduced. U.S. Pat. No. 3,877,036 to Loeffler et al., for example, discloses a bipolar scanning configuration wherein both positively and negatively charged droplets are directed to an electric field which causes those droplets to impinge upon a record medium at a location dependent upon the magnitude of the charge. While both bipolar and interlace strategies exist in the prior art, to applicant's knowledge, there has been no suggestion to modify the conventional bipolar and/or interlace strategy in conformity with the technique disclosed in the present application.

SUMMARY OF THE INVENTION

The present inention combines an interlace strategy with a bipolar architectural configuration and in addition takes into account drop charging histories to reduce the adverse affect experienced by drop to drop and drop with air interactions. Through practice of the invention an improved performance bipolar stitched configuration is achieved wherein the flight path between ink jet generator and paper is shortened and drop placement accuracies are enhanced.

Apparatus constructed in conformity with the invention comprises an ink jet marking array having a number of ink jet column generators, each generator including means for directing a series of ink droplets in the direction of a recording medium. The apparatus includes spaced electrodes for creating regions of substantially uniform electric field strength through which the ink droplets travel in their trajectory towards the recording medium. The electrodes are configured in relation to the generator such that each series of droplets from a given generator enters an associated region substantially midway between the electrodes. In other words, a bipolar scanning arrangement is envisioned.

A charging mechanism is included for inducing charge on the droplets prior to the travel to an associated region thereby causing the droplets to strike a particular area of the recording medium or to travel to means for intercepting the droplets. The subsequent droplet trajectory depends upon the induced charge polarity and magnitude provided by the charging mechanism. The charging mechanism operates to spatially separate closely adjacent droplets to diminish electrostatic and aerodynamic interactions between the closely adjacent droplets in their path to the recording medium.

The combination of interlace strategy with bipolar scanning reduces the flight path required to properly stitch the ink jet coverage. By reducing the flight path, both aerodynamic and electrostatic interactions are diminished thereby increasing the predictability of proper droplet placement on the recording medium. It has been observed that the use of an interlace approach with a bi-polar scanning architecture obviates the need for guard drops.

According to a preferred embodiment of the invention, the spaced electrodes for creating the electric fields through which the droplets pass are configured to maintain the regions at electric field strength slightly less than the breakdown field of air for the particular environment in which the ink jet apparatus is to perform. By maintaining the electrodes at very high potentials, the charge necessary to completely cover the recording medium is diminished and therefore the coulomb interaction between highly charged gutter drops and those droplets directed to the paper are diminished.

According to a second feature of the invention, the drop charge history is taken into account for each of the subsequent drops in determining how large a charge should be induced at the charging tunnel. Thus, for example, a droplet in close proximity to a number of highly charged gutter drops has the induced charge modified to take into account both the secondary charge induction caused before droplet breakoff and the inevitable coulomb interaction between the drop and those highly charged gutter drops.

According to the preferred architectural design, the gutters for intercepting droplets not directed to the paper form an integral part of the electrodes for creating the high intensity electric field. In this configuration, alternate ones of the electrodes are grounded and these grounded electrodes are utilized as both field generating electrodes and as a conduit for recirculating unused ink droplets back to the ink jet generator.

From the above, it is apparent that one object of the present invention is to reduce the adverse effects experienced by ink droplets through coulomb and aerodynamic interactions on their trajectory toward the paper path. This and other objects of the present invention will become better understood when the detailed description of the preferred embodiment of the invention is considered in conjunction with the accompanying drawings.

DETAILED DESCRIPTION OF A PREFERRED EMBODIMENT

Figure 1:
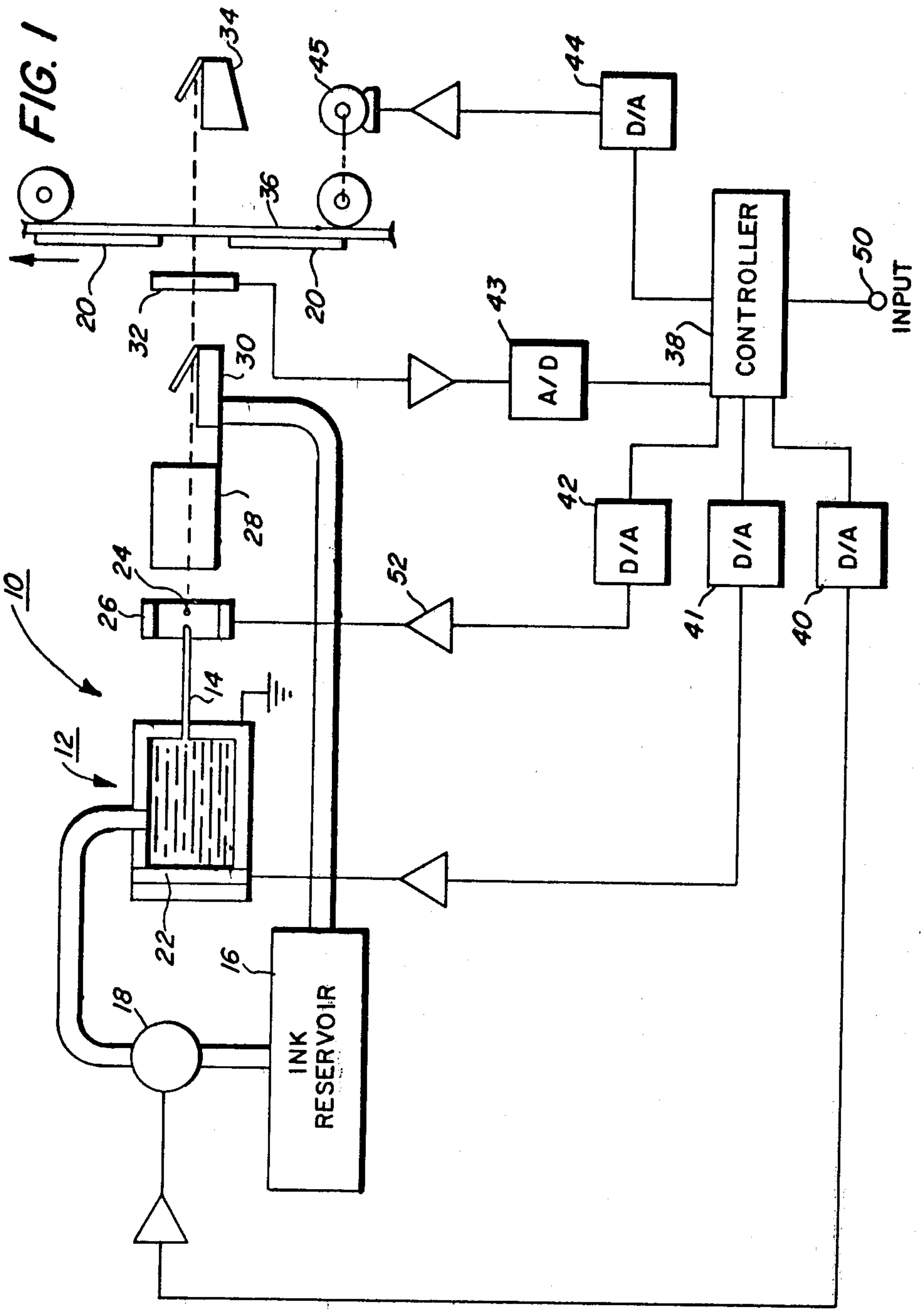
FIG. 1 is a schematic elevation view of an ink jet printing apparatus.

Refer now to the drawings and in particular FIG. 1, wherein there is depicted a schematic representation of a Sweet type ink jet printer 10 comprising an ink jet generator 12 having a manifold for generating a plurality of jet columns 14. Since FIG. 1 is a side view only one column is seen in that figure but it should be appreciated that a series of nozzles extend along the manifold to generate a series of parallel ink columns. The generator 12 is coupled to an ink reservoir 16 from which ink is pumped by a pump 18 to the generator 12. The pump 18 maintains ink inside the generator 12 at a pressure sufficient to cause ink to be squirted through orifices in the manifold toward a recording member 20 moving in relation to the ink jet generator 12. Also coupled to the generator 12 is a source of excitation 22 which causes the columns 14 to break up into ink droplets 24 at a well-defined distance from the generator 12. As the columns 14 are breaking up into individual droplets 24, a charging electrode 26 induces a net electric charge on each droplet in accordance with a scheme related to a desired subsequent droplet trajectory.

Downstream from the charging electrode 26 are located a number of field creating electrodes 28 which are energized to voltages which create an electric field through which the charged droplets 24 must pass. As is well known, a charged particle passing through an electric field will experience a force related to both the magnitude and polarity of the charge on the particle and the electric field strength through which it is passing. An uncharged droplet, therefore, will pass unimpeded through the electrodes 28 toward the recording member 20. A charged particle will be diverted in its initial trajectory depending upon its charge magnitude and polarity. By transmitting appropriate charging potentials to the charging electrode 26 as each droplet passes that electrode, it is possible to selectively bend or redirect those droplets to a desired portion of the recording medium.

As will be seen below in relation to the discussion of an exemplary bipolar ink jet printer, certain highly charged droplets are directed to a gutter 30 for recirculation to the ink reservoir. The reason that these droplets must be highly charged will become apparent when discussing the bipolar system.

Droplets which are either uncharged or charged to a level insufficient to cause their trajectory to lead to the gutter 30, are directed past a droplet sensor 32 to the recording medium 20. The drop sensor 32 is used to sense passage of ink droplets toward the recording media and modify printer operation to insure that ink droplets from the plurality of columns are properly stitched together to allow each incremental region on the recording medium to be accessed by droplets from one of the manifold nozzles. An example of the use and application of a typical drop sensor 32 is disclosed in U.S. Pat. No. 4,225,754 to Crean et al. entitled "Differential Fiber Optic Sensing Method and Apparatus for Ink Jet Recorders" which has been assigned to the assignee of the present invention. The Crean et al. patent is herein expressly incorporated by reference. The functioning of the drop sensor 32 is to calibrate the printer by observing droplet trajectories during a calibrate mode of operation.

A second gutter 34 for recirculating ink droplets is used to intercept droplets generated while calibrating the system with the aid of the drop sensor 32. One application to which the present invention has particular applicability is a high speed ink jet device wherein successive sheets of paper are transmitted past the ink jet print and encoded with information. Experience has indicated that it is desirable to recalibrate the printer at periodic intervals to insure that the droplets 24 are directed to desired regions on the recording member 20. To accomplish this calibration, ink droplets are generated and caused to travel past the sensors 32 when no recording member 20 is in position to receive those droplets. In the calibrate mode of operation, it is therefore necessary that a gutter 34 be positioned to intercept droplets when no recording member is present.

A transport mechanism 36 is also shown in FIG. 1. The transport 36 is used to move individual sheets of paper or the like past the printer 10 at a controlled rate of speed. Since the present printer is a high speed device, a mechanism must be included in the transport 36 for delivering unmarked paper to the transport and for stripping marked paper away from the transport once it has been encoded by the priner 10. These features of the transport 36 have not been illustrated in FIG. 1.

Ink droplet generation, charging and recording medium transport are all controlled by a central processor or controller 38 which interfaces to the various components of the printer 10 by digital to analog and analog to digital converters 40–44. Details regarding the functioning of the controller 38 and in particular the details regarding the application of charges to the droplets will be discussed subsequently in relation to FIGS. 8 and 9.

Figure 2:
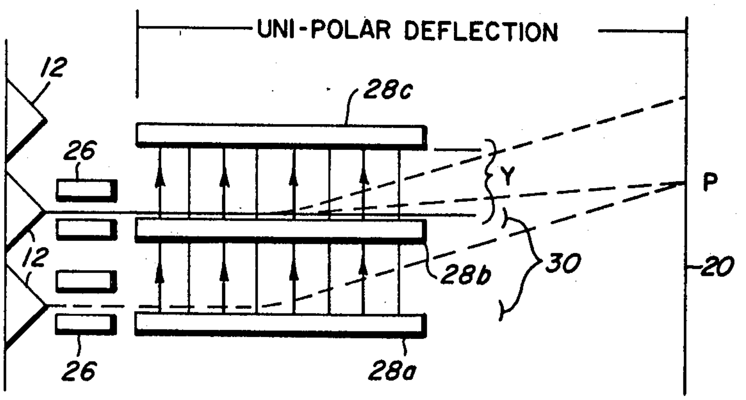
FIG. 2 is a top view of a unipolar ink jet deflection configuration.

As mentioned previously, the present application relates to an improved ink jet printer wherein the particular architecture chosen comprises a bipolar Sweet type generator. To illustrate the advantages of such a bipolar arrangement, both a unipolar and bipolar system have been illustrated in FIGS. 2 and 3. The unipolar system shown in FIG. 2 is similar in design to the ink jet printer illustrated in U.S. Pat. No. 4,238,804 to Warren which issued on Dec. 9, 1980. In a unipolar system, each droplet is either uncharged or charged to a magnitude related to its desired position in the paper plane. In the illustrated unipolar architectural design, it is necessary that the droplets which are charged (i.e non-guttered drops) all receive the same polarity charge at the charging electrode 26. Thus, if the electric field in FIG. 2 is directed from electrode 28*a* to 28*b* and from 28*b* to 28*c*, the charge applied by the charging electrode 26 must apply a positive charge to each droplet at the time of droplet breakoff to cause those droplets to be deflected as illustrated in FIG. 2. In a unipolar arrangement, uncharged droplets pass in close proximity to one of the field generating electrodes 28 and are collected by the gutter 30.

The distance between the end of the field generating electrodes 28*a*, 28*b*, and 28*c* and the paper plane is more than half the entire distance between the entrance to the electrodes and the paper plane. This rather long path length is required to enable droplets from adjacent ink jet columns to be stitched together to cover the entire width of the paper. Thus, the lowermost stream of droplets from the bottom column in FIG. 2 must be capable of being deflected to a point P where droplets from the next column can intercept the paper. Due to the unipolar construction, droplets from this adjacent column must be charged an amount to cause them to miss the gutter 30 and travel to the stitch point P. It is seen that the deflection distance y that a maximumly deflected droplet must traverse between each pair of electrodes is almost equal to the separation between those electrodes.

Choice of a unipolar system has adverse affects on drop to drop and drop with air interactions. In order to insure that droplets from adjacent columns are properly stitched together, a long flight time is required after the droplets leave the charging electrodes 6 until they strike the paper. Coulomb and aerodynamic interaction occur over a substantial timespan and as a result, the charged droplets which strike the paper can be badly misplaced. The droplet misplacement occurs non-linearly with time so that small initial placement errors are amplified the longer it takes those droplets to reach the recording medium.

Figure 3:
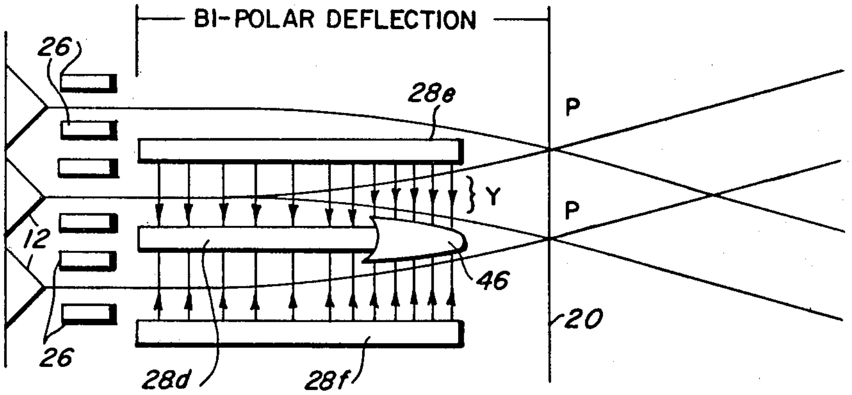
FIG. 3 is a top view showing a bipolar deflection configuration constructed in accordance with the present invention.

Turning now to FIG. 3, there is illustrated a bipolar ink jet arrangement wherein the geometrical relation between the charging electrodes 26 and the generator 12 has been modified to reduce drop misplacements. The term bipolar is used since the charged droplets passing through the deflection electrodes 28 may be either positively or negatively charged depending upon their desired locations in the print plane. According to a preferred embodiment of the bipolar arrangement, alternate ones of the field generating electrodes 28 are grounded. For this reason, the direction of the electric field generated by the electrodes 28 alternates between subsequent ones of the electrode pairs. Thus, if the electrodes 28*d* is grounded while the electrodes 28*e* and 28*f* are maintained at a positive potential, the lines of electric field would be directed toward the grounded electrode 28*d*. In the bipolar configuration, ink droplets enter the region between field generating electrodes 28 at a position approximately midway between those electrodes. If uncharged, these droplets will pass straight through the electrodes and strike the paper path. If positively charged, they will be deflected toward the grounded electrode 28*d*. If negatively charged, they will be deflected away from this electrode. Those droplets which are not to be printed on the recording medium 20 are charged to a sufficient degree to cause them to be deflected to a gutter 46 comprising a portion of the grounded electrode 28*d*.

A comparison of the bipolar arrangement (FIG. 3) with the unipolar arrangement (FIG. 2), illustrates the advantages of the bipolar system from a drop placement strategy standpoint. The maximum deflection y for a given droplet between the deflection electrodes is only approximately one half the spacing between those electrodes 28. By incorporating the gutter 46 into alternate ones of the field generating electrodes it is no longer necessary that paper-bound droplets avoid a protruding gutter as was the case for a unipolar system. It is seen by comparing the FIG. 3 bipolar arrangement with the FIG. 2 unipolar architecture that the requirement that adjacent ink droplets be stitched together at a stitch point P is achieved much easier with a bipolar system and that the distance between the electrodes 28 and the paper plane is significantly reduced.

It is apparent that the reduced distance between electrodes and paper path reduces the electrostatic and aerodynamic interactions which the droplet must experience on its trajectory to the paper. Since the maximum deflection of any printed drop has been decreased in the bipolar system, it is also possible that the total charge applied to the droplets can be reduced with accompanying reduction in coulomb electrostatic interactions. The magnitude of the electrostatic force between two charged droplets is proportional to the product of the absolute value of the charge on those droplets. A bipolar system using both positive and negative charges results in smaller charge magnitudes and thus smaller droplet misplacements. From the above it is seen that the utilization of a bipolar ink jet printing architecture can have significant advantageous effects on droplet placement accuracy since both causes of droplet inaccuracies have been reduced.

Representative distances for a unipolar configuration using 2 mil diameter drop and 85 mil channel separation might be on the order of one inch between the beginning of the field generating electrodes 28 and the paper plane. With the proposed bipolar construction, this distance has been reduced to approximately 0.7 of a inch.

Figure 4:
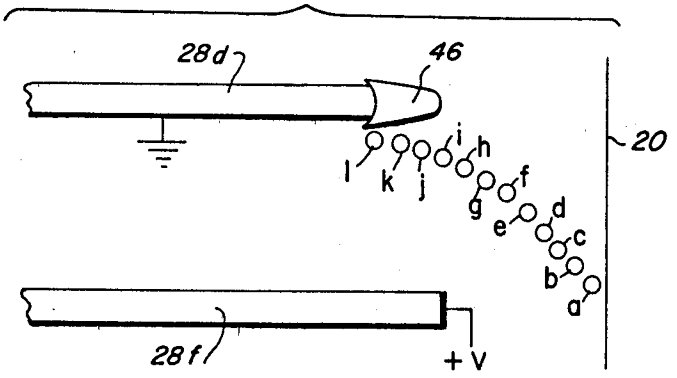
FIG. 4 shows a series of an ink droplets in travel to a printing medium.
Figure 5:
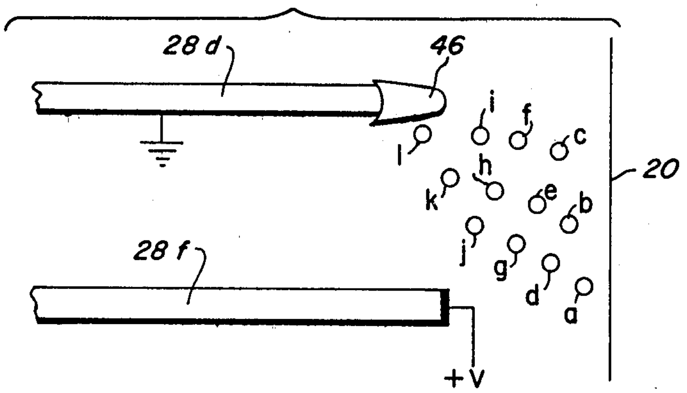
FIG. 5 shows a series of droplets similar to those shown in FIG. 4 but wherein the droplets have been interlaced to reduced drop placement inaccuracies.

In accordance with the present invention, the previously discussed bipolar deflection architecture is combined with a droplet interlace strategy which further reduces aerodynamic and electrostatic interaction between droplets. Turning now to FIGS. 4 and 5, there are illustrated two sequences of twelve ink jet droplets a–l as they might appear in their trajectory toward the paper plane. In both sequences all twelve droplets are directed to strike the paper, i.e. no gutter droplets have been illustrated. In the sequence of droplets directed to the paper shown in FIG. 4, it is seen that the drop to drop spacing is quite close and that some drops experience a much greater aerodynamic braking effect than other drops in the series. The short drop to drop dimension will increase coulomb repulsions and attractions between droplets especially when aerodynamic braking effects further reduce the drop to drop spacing. For this reason, if the sequence of droplets shown on FIG. 4 is directed to the recording medium 20, the drop misplacement for each droplet would be significant.

The sequence of droplets shown in FIG. 5, however, have been interlaced so that whereas droplet a is the first droplet to strike the paper and droplet b is the second droplet, etc., the first and second droplets are not closely adjacent to each other but have been separated to reduce both aerodynamic and coulomb interactions. By utilizing, for example, a triple interlace arrangement, the spacing d (see FIG. 6) between droplets progressing along closely adjacent paths has been tripled. This increased separation reduces both aerodynamic slip streaming since each droplet experiences essentially the same air resistance but also reduces the coulombic interaction between droplets along the $d_1$ direction.

Figure 6:
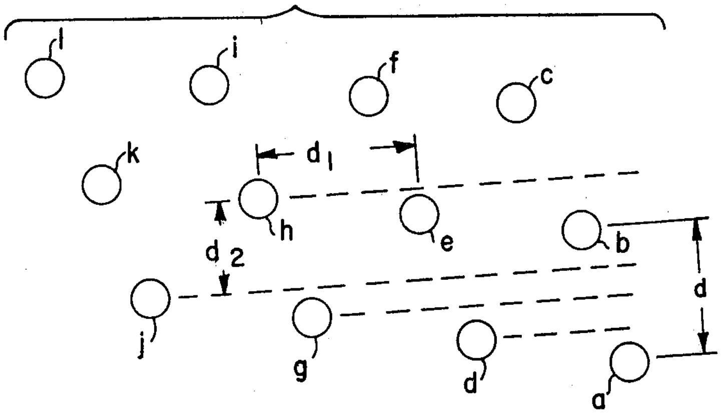
FIG. 6 is an enlarged view of the interlaced droplets depicted in FIG. 5.

By reference to FIGS. 5 and 6 it should be appreciated that a second coulomb interaction has been introduced along a direction $d_2$ perpendicular to the direction of droplet travel shown in dashed lines. Since there is little or no aerodynamic interaction along this direction, however, and the flight path is shortened through use of the bipolar architecture, the coulomb interaction in this dimension is relatively insignificant.

Figure 7:
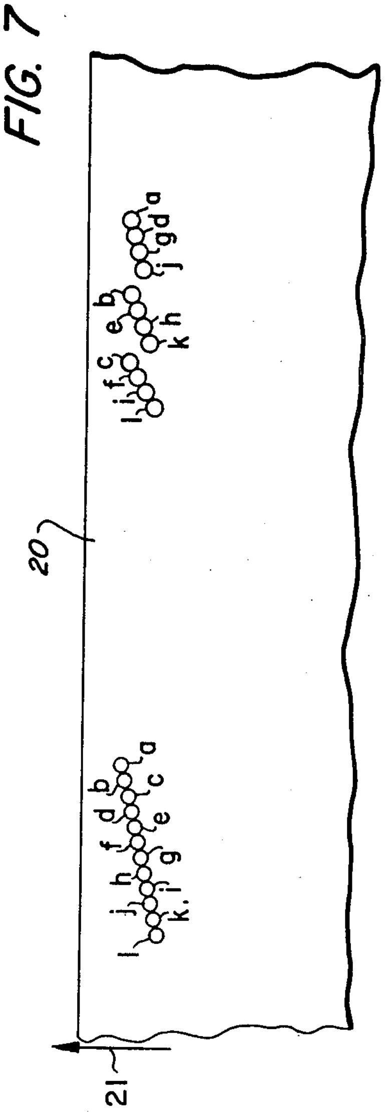
FIG. 7 shows a schematic representation of the drop placement on a record medium corresponding to interlaced and non-interlaced drop trajectories.

The interlace technique enhances drop placement accuracy but at a slight increase in printing complexity. FIG. 7 shows the positioning of the FIGS. 4 and 5 droplets on the medium 20. To the left in FIG. 7 is the FIG. 4 droplet placement and to the right is the FIG. 5 interlace drop placement. The skewing of droplets is caused by the movement of the medium 20 in relation to the printer 10 as depicted by arrow 21. Techniques for adjusting for both the sequential and interlaced pattern are known in the art and need no further explanation.

The combination of a bipolar architecture with an interlace strategy for drop placement results in significant improvement in drop placement accuracy. A third feature when added to the above-mentioned concepts can be utilized to enhance even further the printer accuracy. This third feature is a utilization of drop charging histories to anticipate and correct for those aerodynamic and coulomb interactions which remain even through their adverse affects are reduced. The drop history strategy can be understood by examining the drop charging techniques and in particular by examining the methodology for applying voltages to the charging electrode 26.

Referring to FIG. 1, the methodology begins with the receipt by a controller input 50 of a series of signals representative of a desired voltage to be applied to the charging electrode 26. The controller 38 converts these signals to a digital voltage representation which is output to a digital to analog converter 42 which converts the digital signal representative of the desired voltage into an analog signal which is coupled to a power amplifier 52. In addition to generating a charging voltage for the plurality of charging electrodes 26, the controller 38 monitors and/or provides control signals for a variety of other components in the printing system 10. Thus, as seen in FIG. 1, the controller 38 receives inputs from the sensor 32 via an analog to digital converter 43, controls the speed of movement of the recording medium 20 via a second digital to analog converter 44 which drives a motor 45, controls perturbation in the ink jet generator 12 by the source of excitation 22 through a third digital to analog converter 41, and controls the p ressure maintained inside the generator by the pump 18 with a fourth digital to analog converter 40. Although critical to the operation of the printing mechanism 10, these functions do not relate directly to the preferred architectural design embodied by the present invention and therefore need no further description.

Figure 8:
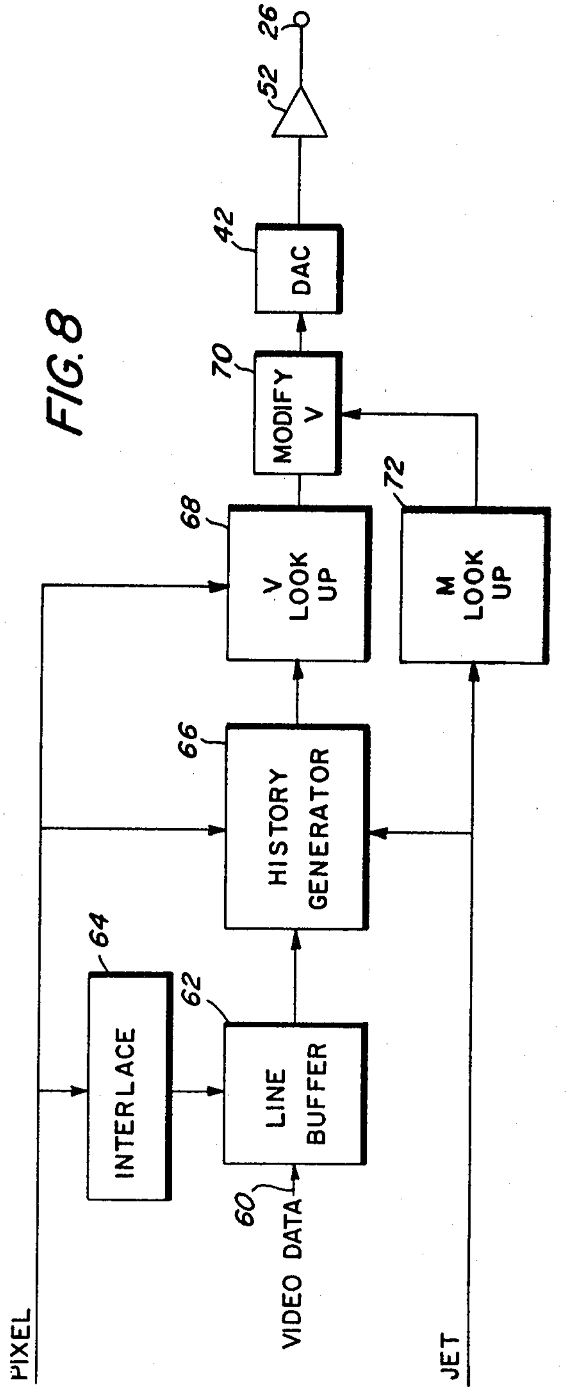
FIG. 8 is a schematic showing a method for charging the ink droplets in accordance with the present invention.

Turning now to FIG. 8, the input 50 to the controller 38 is represented at the left hand portion of the figure by the video data signal 60. The video signals comprise a series of print/no print commands representative of a desired information scheme to be encoded on the recording medium 20. The video data is transmitted to the controller in bit fashion where, for example, a set or high bit indicates a particular drop is to be printed on the paper and a reset or zero bit indicates the particular drop corresponding to that bit is to be transmitted to the gutter 30 shown in FIG. 1 or gutter 46 shown in FIG. 3.

The disclosed technique for converting these video signals to analog charging voltages utilizes a so-called "pipelining" technique wherein digital holding registers are series coupled between the video input and the amplifier 52. By controlled clocking of these registers, the data contained therein is moved stepwise through the processing path from one register to the next. As the data proceeds from one register to the next through the pipeline, it is processed according to the format to be described. After a discrete number of controller generated clock pulses, data in the pipeline has passed through all processing stations and reached a stage where it is output to the digital to analog converter 42.

The actual physical implementation of the pipelining can be accomplished in a variety of ways dependent upon the capabilities of the controller 38. Each block in FIG. 8 corresponds to a particular function rather than a particular circuit since that function might be performed by dedicated circuitry or alternatively through software control of a programmable processor.

As a first step in the pipelining process, the video bit data is stored in buffer 62 so that print or no print information for many pixels is stored for subsequent processing. The size of the particular buffer or storage can vary with the application and in one embodiment, the buffer has storage capacity large enough to store four consecutive lines of pixels at a given time. During each controller clock interval or drop interval, a pixel bit for each jet or nozzle comprising the printing system 10 is read from the buffer to the pipeline.

The buffered or stored information is a sequence of binary bits corresponding to the desired print or no print information for each pixel in sequence across a given nozzle's paper segment. When the data is read from the buffer, however, it is interlaced so that the serial data stored in the data buffers is scrambled as it enters the pipeline. This scrambling or interlacing of bit information is accomplished with the use of an interlace look-up table 64 which dictates the pattern by which the bits buffered in the controller enter the pipeline. According to one embodiment, the look-up table is implemented in a portion of controller memory.

Once a particular drop signal exits the buffer region it enters a portion 66 of the pipeline where a charging voltage is generated for that droplet. This voltage is related to the charging sequence on those droplets both preceding and following that particular drop and according to the preferred embodiment of the invention this so-called "history generator" is implemented with a serial shift register which is clocked at the drop generation frequency. The bit pattern from the shift register is combined with information regarding pixel location and nozzle position to generate a unique address in the controller's address space.

By way of example, in the illustrated embodiment of the invention each nozzle addresses 12 pixels across the width of the paper. Thus, four bit locations in the address space will uniquely designate the pixel location for a given droplet. If eleven drop histories (10 other droplets in addition to the droplet under consideration) are taken into account in computing the correct charge for the droplet under consideration these eleven bits of information (print or no print) are combined with the five pixel designating bits to create a 16 bit sequence related to charging history and pixel location. This combination of factors results in a 16 bit sequence of bits corresponding to an address in the controller memory space. Once this address is generated a 64K×10 bit memory look-up table is accessed at step 68 to provide a unique 10 bit drop charge voltage. If fewer than eleven drop histories are used, a smaller look-up table can be used to produce the correct drop charge.

The drop history look-up table technique enhances the bipolar and interlace strategy. The drop history look-up table compensates for instances in which a particular sequence or series of droplet charging would cause a drop misplacement even using drop interlace and bipolar charging. The look-up table improves drop placement in the situation, for example, where a series of gutter droplets which are highly charged both precede and follow a droplet which is not to be guttered but is scheduled to strike the recording medium at a location not far removed from the gutter 46. In this situation drop to drop interaction may be significant and the look-up table provides a means for taking this interaction into account to provide accurate drop placement.

The actual values stored in the look-up table 68 are derived from both theoretical modeling of the ink jet printing process and experience derived from observing actual drop to drop interactions and their effect on drop placement. The most straight forward technique is to image patterns corresponding to each sequence of drops (the print and no print pattern) and adjust the voltage in the look up table until the drop strikes the correct location. A less time consuming method is to experimentally determine some voltage value and mathematically interpolate the remaining look-up table values. The look-up table generation process is simplified by computer models of the flight coulombic and aerodynamic interactions.

Subsequent to the history look-up table generation of a charging voltage, this voltage is modified and delayed at a step 70 labeled modify V in the signal pipeline. The modification of charging voltage at this step is also obtained from a look-up table 72 which alters the charging voltage in accordance with the characteristics of the particular nozzle which is to generate the droplet. This correction factor or modifier takes into account nonuniformities in channel performance and insures that adjacent nozzles stitch together their coverage on the medium 20. It is at this point in the charging process that information from the drop sensor 32 is used to insure that the droplets from adjacent nozzles stitch together to cover the entire medium 20. Once these modifiers have been applied to the 10 bit digital charging voltage, the digital to analog converter 42 converts this digital signal into an analog signal which is amplified and coupled to the charging electrode 26.

Figure 9:
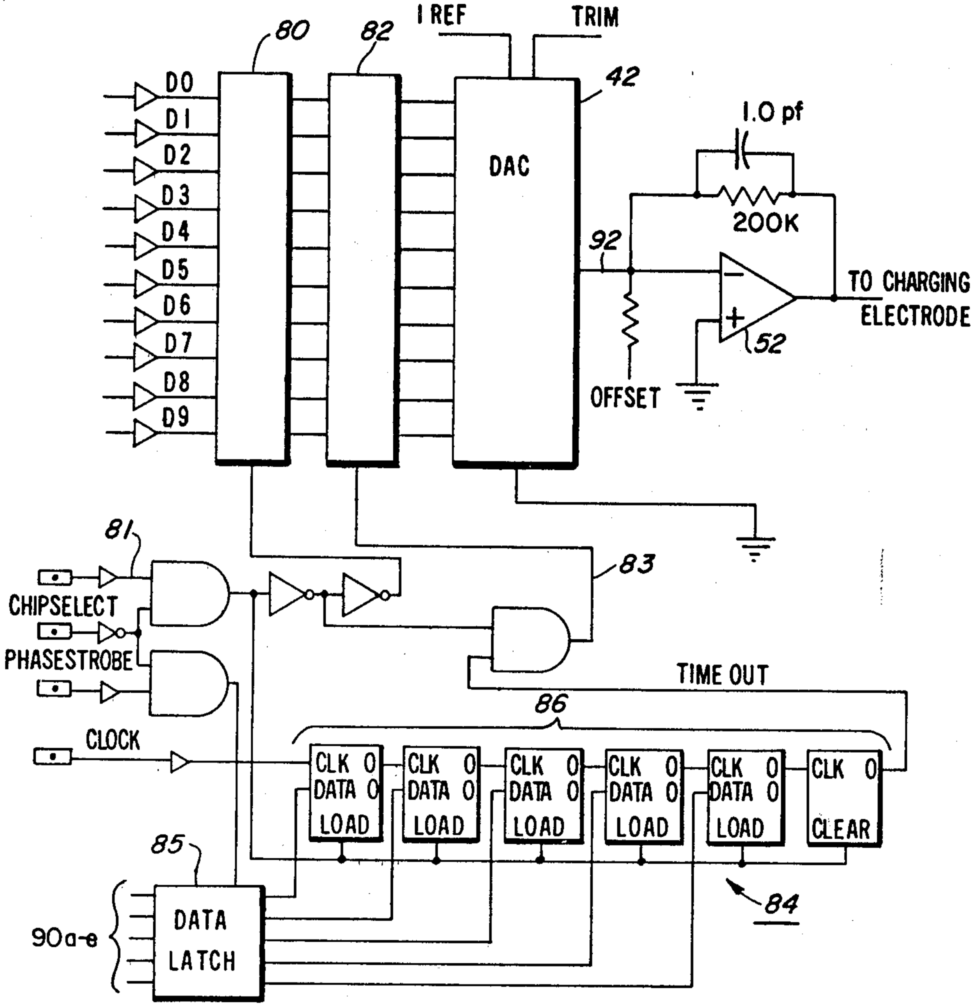
FIG. 9 shows an amplifier subsystem used for converting a digital signal related to the desired charge on a droplet to analog voltage for charging that droplet.

FIG. 9 shows a circuit diagram of the digital to analog converter 42 and power amplifier 52. The 10 bit charging signal is presented on inputs labeled D0–D9. This data is strobed to a first data latch circuit 80 by a signal 81 from the controller 38. After a number of controller clock pulses the digital signal in this first latch 80 is strobed to a second latch 82 and the digital to analog converter 42 by a second signal 83 from a phasing circuit 84.

The delay between receipt of data by the first latch 80 and receipt of that data by the digital to analog converter 42 is programmable. The phasing circuit 84 includes a data latch 85 for inputting signals to the data inputs of a series of flip-flops comprising a down counter 86. Data from the latch 85 is strobed to the counter 86 by the first clock signal 81. The down counter is clocked by a controller clock and when it times out, the second signal 83 strobes the charging data to the digital to analog converter 42.

The timing of this data transfer depends on the values of five inputs 90*a–e* to the data latch 85. By changing the inputs 90*a–e* the charging of the electrode 26 is controlled. This adjustment insures the proper charging voltage as represented by the inputs D0–D9 appears on the electrode 26 at the time of drop breakoff so that a corresponding charge is induced on the droplet.

The output 92 from the digital to analog converter 42 is a relatively low level signal which is amplified by the power amplifier 52 and transmitted to the charging electrode 26. Both the digital to analog converter 42 and amplifier 52 must be fast acting since the drop generation frequency of a typical ink jet system is on the order of 200Khz and the voltage on the charging electrode 26 must be switched and stabilized at this frequency.

In conjunction, the above disclosed methodology, bipolar architecture and interlace strategy cause the droplets from a given nozzle in the system to be placed on the recording medium with a great degree of accuracy. It is believed that the charging and interlace methodology can be accomplished in a variety of ways and it is the intent therefore that all design modifications and alterations falling within the spirit or scope of the accompanying claims be covered by the present invention.

We claim:

1. In an ink jet marking array having a plurality of ink jet column generators, each generator including means for directing a series of ink droplets in the direction of a recording medium, apparatus comprising:

spaced electrodes for creating regions of substantially uniform electric field strength through which said ink droplets travel in their trajectory toward said recording medium, said electrodes configured in relation to said generators such that each series of droplets from a given generator enter an associated region substantially midway between two electrodes, and alternate ones of said spaced electrodes being electrically grounded and other ones of said electrodes being maintained at a uniform electric potential with respect to electrical ground so that said electrodes, in combination, provide a series of regions along the array width having electric field strengths substantially the same in magnitude but opposite in direction;

means for inducing charge on said droplets prior to their travel to said associated region of substantially uniform electric field strengths thereby causing said droplets to strike a particular area of the recording medium or to travel to means for intercepting said droplets depending on the induced charge polarity and magnitude, said means for inducing charge being operative to spatially separate closely adjacent droplets to diminish electrostatic and aerodynamic interaction between said closely adjacent droplets in their path to the recording medium, and said means for inducing charge comprising circuitry for causing droplets from a particular generator to scan across a portion of the array width and said spatial separation being performed by applying an interlace charging sequence to said droplets.

2. The apparatus of claim 1, wherein said means for intercepting said droplets are incorporated in said grounded spaced electrodes, the grounded electrodes being configured to define a surface for intercepting selected ones of said droplets for collection and recirculation to the ink jet column generators, thereby defining regions of said recording medium not to be contacted by ink droplets from a particular ink jet column generator.

3. The apparatus of claim 1 which further comprises means for maintaining consecutive ones of said spaced electrodes having a uniform electric potential at electric potentials sufficient to create an electric field strength slightly less than the breakdown strength of air for the environment the array is to be used, so that the induced charge on the droplet may be diminished and yet be sufficient, under the influence of electric field, to completely cover an allotted particular area of the recording medium, the resulting diminished charge of the droplets providing the additional benefit of reduced electrostatic interaction between closely adjacent droplets in their path to the recording medium.

4. A process in ink jet recording wherein a series of ink droplets are directed to controlled locations on a record medium, said process comprising the steps of:

directing a number of ink columns defining an ink jet array toward said medium, ink in said columns having a controlled speed of movement toward said medium;

perturbing said ink to cause said columns to break off into droplets at a desired distance from said record medium;

charging each droplet either positively or negatively to a particular magnitude related to a desired subsequent trajectory for said droplet;

generating a uniform electric field for each column to cause droplets from each of said columns to be deflected as the droplets pass therethrough in accordance with each droplet's charge magnitude and polarity said uniform electric field being generated between a series of pairs of parallel aligned electrodes when the electrode pairs are separated by appropriate voltage, one pair of electrodes being provided for each column of droplets and each pair having confronting field generating surfaces substantially parallel to an initial direction of ink droplet travel, one electrode of each pair of electrodes in said series of pairs being grounded so that alternating adjacent electrodes throughout the series of pairs of electrodes are grounded and wherein the non-grounded electrodes are maintained at said appropriate voltage so the uniform electric field is slightly less than the breakdown field strength of air;

directing the charged droplets of each column toward the midpoint between confronting field generating surfaces of its associated pair of electrodes; and determining the magnitude and polarity of droplets from a particular column chosen so as to interlace successive droplets thereby separating said charges to diminish electrostatic interaction between successive ink droplets.

* * * * *